July 31, 1951  A. SCHMIDT  2,562,824
TRAILER HITCH

Filed Oct. 7, 1948  2 Sheets-Sheet 1

Fig. 4.  Alvin Schmidt
INVENTOR.

BY

July 31, 1951  A. SCHMIDT  2,562,824
TRAILER HITCH

Filed Oct. 7, 1948  2 Sheets-Sheet 2

Alvin Schmidt
INVENTOR.

UNITED STATES PATENT OFFICE 2,562,824

TRAILER HITCH

Alvin Schmidt, Corn, Okla.

Application October 7, 1948, Serial No. 53,181

2 Claims. (Cl. 280—33.44)

My invention relates to improvements in trailer hitches for coupling trailers to the rear ends of automobiles.

The primary object of the invention is to provide a hitch device especially designed for easy, quick attachment to the chassis frame of present-day automobiles and to the rear bumpers of such automobiles in a manner such that the hitch and bumper each reinforce and strengthen the other and the load of the trailer is pulled by the chassis frame of the automobile.

Another object is to provide a device of the character and for the purpose indicated which involves a minimum number of parts and is more economical to manufacture than devices of a similar character.

Other and subordinate objects, within the purview of my invention, together with the precise nature of my improvements, will be readily understood when the succeeding description and claims are read with reference to the drawings accompanying and forming part of this specification.

In said drawings:

Figure 4 is a fragmentary view in horizontal section illustrating the manner in which the trailer hitch is attached to the bumper;

Figure 1:
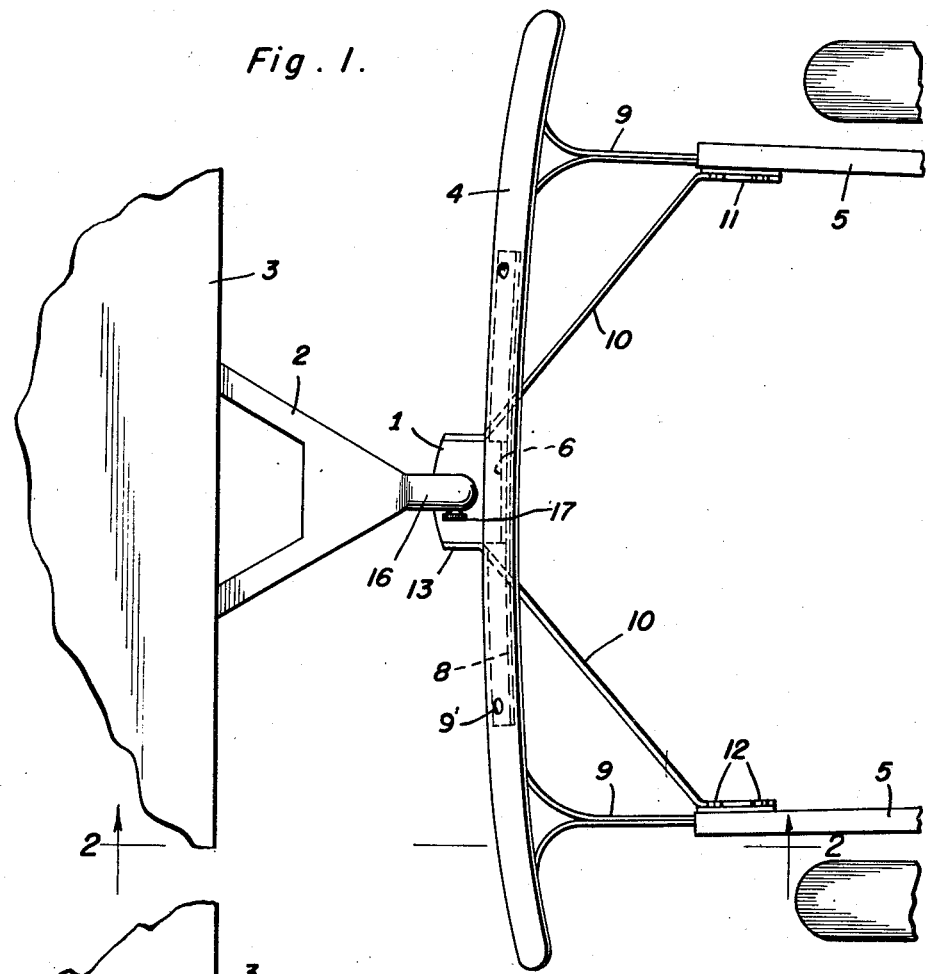
Figure 1 is a fragmentary view in plan illustrating my improved trailer hitch in a preferred embodiment thereof.

Referring to the drawings by numerals, and first to Figures 1 to 4, in the preferred embodiment thereof my improved trailer hitch comprises a horizontal coupling plate 1, of any suitable size, for supporting the usual hitch tongue 2 of a trailer 3 and which is attached to the rear bumper 4 of an automobile to extend rearwardly beneath the bumper 4 in the transverse center thereof and is also attached to the chassis side bars 5 of the automobile, all as will now be described.

The coupling plate 1 is formed with a front vertical reinforcing flange 6 extending above and below the same and which is welded, as at 7, above said plate 1 to the rear side and in the transverse center of a bumper reinforcing bar 8 bolted at its ends to the usual bumper carrying arms 9 by bolts 9' that secure said bumper 4 to said arms 9. The bumper reinforcing bar 8 is bolted, as described, to the front side of the bumper 4 with the upper portion of the flange 6 interposed between said bumper and reinforcing bar. Also, the bumper reinforcing bar is curved to conform with the usual curvature of the bumper 4.

Figure 2:
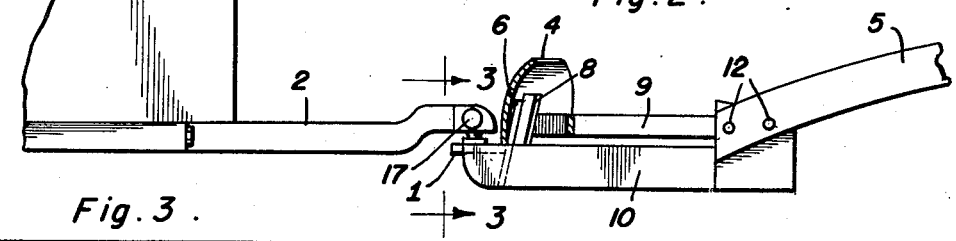
Figure 2 is a view in longitudinal section taken on the line 2—2 of Figure 1.
Figure 3:
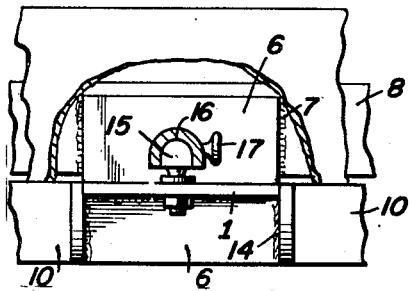
Figure 3 is a view in transverse section taken on the line 3—3 of Figure 2 and drawn to a larger scale with the bumper partly broken away.

A pair of hitch bars 10 diverge forwardly from opposite side edges of the coupling plate 1 for attachment to the rear ends of the chassis side bars 5 of the type of chassis frame in which said bars 5 are not cross connected at the rear ends thereof. The hitch bars 10 are provided with angular front ends 11 adapted to fit alongside the rear ends of said side bars 5 and be bolted thereto by the bolts 12 that secure the bumper carrying arms 9 to said ends of said side bars 5. The hitch bars 10 are also provided with angular rear ends 13 fitting against the sides of the coupling plate 1 and being attached to said sides and to the ends of the flange 6 by welding, as at 14 said ends 13 forming depending side edge flanges on said plate 1. The hitch bars 10, as best shown in Figure 2, underlie the bumper 4 and the bumper reinforcing bar 8 so as to extend rearwardly thereof to position said plate 1 rearwardly of the bumper 4.

The coupling plate 1 is provided with the usual ball end upright stud 15 over which the usual socket member 16 on the trailer tongue 2 is secured as by the screw 17 to provide a swivel connection between said tongue and stud.

Figure 5:
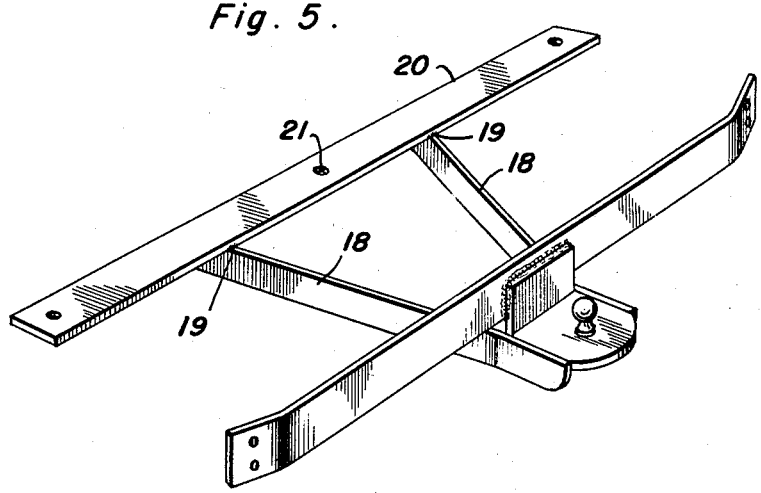
Figure 5 is a view in perspective of a modified embodiment of the invention.

In the modified embodiment of the invention shown in Figure 5, the hitch bars 18, corresponding to the hitch bars 10, are welded, as at 19, to the under side of a cross bar 20 having bolt holes 21 therein for bolting said bars to the under side of an end cross member, not shown, of a type of chassis frame in which the chassis side bars are cross connected adjacent the rear ends thereof. Otherwise the construction is the same as described with reference to the preferred embodiment of the invention.

Figure 6:
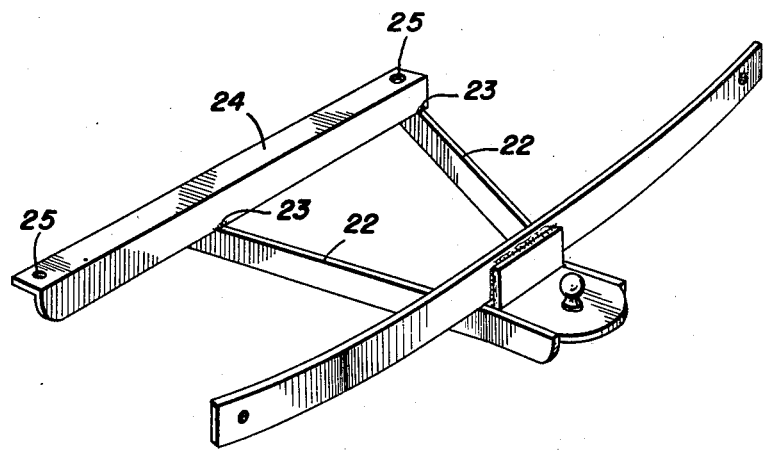
Figure 6 is a similar view of another modified embodiment.

In the modified embodiment of the invention shown in Figure 6, the hitch bars 22 are welded, as at 23, to an angle cross bar 24 corresponding to the cross bar 20, and which is adapted to fit over a rear end cross connection on a chassis frame and be bolted thereto through bolt holes 25 in said bar. Otherwise the construction is the same as in the modified embodiment first described.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

Having described the invention, what is claimed as new is:

1. A hitch device for coupling a trailer tongue to the rear end of an automobile having chassis frame side bars and a rear bumper, said device comprising a coupling plate adapted for coupling said tongue thereto and fitting upwardly against said bumper and extending horizontally below the same rearwardly therefrom, said plate having a front edge vertical flange extending above said plate and fitting against one said of said bumper, a bumper reinforcing bar extending along said side of the bumper and fixed at its ends thereto with said flange fixed to said bar between the same and said bumper, and means rigidly connecting opposite side edges of said plate to said side bars and, said means forming depending side edge flanges on said plate and underlying and supporting said bumper.

2. A hitch device for coupling a trailer tongue to the rear end of an automobile having chassis frame side bars and a rear bumper, said device comprising a coupling plate adapted for coupling said tongue thereto and fitting upwardly against said bumper and extending below the same rearwardly therefrom, said plate having a front edge vertical flange fitting against one side of said bumper, a bumper reinforcing bar extending along said side of the bumper and fixed at its ends thereto with said flange fixed to said bar between the same and said bumper, and means rigidly connecting opposite sides of said plate to said side bars and underlying and supporting said bumper, comprising downturned side flanges on said plate, and bars fixed to said flanges and side bars.

ALVIN SCHMIDT.

REFERENCES CITED

The following references are of record in the file of this patent:

UNITED STATES PATENTS

| Number | Name | Date |
|---|---|---|
| 1,296,563 | Simons | Mar. 4, 1919 |
| 1,473,563 | Julson | Nov. 6, 1923 |
| 2,090,857 | White | Aug. 24, 1937 |
| 2,101,622 | Milligan | Dec. 7, 1937 |
| 2,151,920 | Jandus et al. | Mar. 28, 1939 |